United States Patent [19]

Kimura

[11] Patent Number: 4,638,903
[45] Date of Patent: Jan. 27, 1987

[54] METHOD OF SEPARATING AND COLLECTING COMMODITIES AND DEVICE FOR THE SAME

[75] Inventor: Yoshio Kimura, Tokyo, Japan

[73] Assignee: Tetra Pak International Aktiebolag, Lund, Sweden

[21] Appl. No.: 749,554

[22] Filed: Jun. 27, 1985

[30] Foreign Application Priority Data

Jun. 29, 1984 [JP] Japan ................. 59-136409

[51] Int. Cl.$^4$ ........................... B65G 47/26
[52] U.S. Cl. ................. 198/419; 198/426; 198/429
[58] Field of Search ........... 198/419, 426, 427, 429, 198/434, 445, 456, 457, 483.1; 414/68

[56] References Cited

U.S. PATENT DOCUMENTS 3,923,144 12/1975 Langen ..................... 198/429

FOREIGN PATENT DOCUMENTS 0461546 2/1937 United Kingdom ........... 198/429

Primary Examiner—Joseph E. Valenza
Assistant Examiner—Lyle Kimms
Attorney, Agent, or Firm—Koda and Androlia

[57] ABSTRACT

A method and apparatus for collecting square articles including conveying a series of articles in a longitudinal direction, stopping the articles in front of a first pusher, transversely pushing a predetermined number of articles into a tapered second pusher, advancing the second pusher a distance equal to the length of the article, and retracting the second pusher. The tapered second pusher includes a stepped configuration of a plurality of stages, each stage having longitudinal and transverse sides which are respectively about the same size as the length and width of the article and at least one of the stages in the middle being omitted. A first stopper provided in front of the omitted stage prevents the articles from entering into the omitted stage and a second stopper provided in front of the first stopper prevents the articles in front of the omitted stage from being pushed out of the tapered second pusher.

2 Claims, 14 Drawing Figures

METHOD OF SEPARATING AND COLLECTING COMMODITIES AND DEVICE FOR THE SAME

BACKGROUND OF THE INVENTION

1. Field of the Invention

The present invention relates to a method and a device for separating square commodities, such as rectangular-parallelepiped paper containers for milk, juice, etc., into groups of predetermined numbers and collecting them along a lateral line.

2. Prior Art

In order to collect two sets of commodities, each set consisting of six commodities, two longitudinally and three laterally, a device as shown in FIG. 7 can be employed to laterally push out the commodities conveyed by a conveyor for three times. However, in many cases, the collected commodities are generally pushed out in a direction perpendicular to the running direction of the conveyor as shown by an arrow in FIG. 7 to a following process. Therefore, arrangement and disposition, i.e., layout of a series of related devices is difficult. Further, in relation to installation space, the collected commodities are sometimes desired to be taken out parallel to the running direction of the conveyor.

Furthermore, when collecting the commodities by the devices of FIG. 7, since the so-called line pressure is applied to the commodity indicated by Po in the middle of the driving conveyor, the commodities may tumble when conveying and pushed out, which becomes a problem with respect to stableness of the commodity.

On the other hand, if one conveyor is branched into three rows, the commodities can be separately collected into groups each including two longitudinally, three laterally and totally six commodities. However, this system requires the conveyors to be in rows, which remarkably complicates the entire structures.

SUMMARY OF THE INVENTION

An object of the invention is to satisfy the above demand and solve the above problem.

A method of the invention includes the steps of: successively feeding a group of commodities (herein after called "articles"), which are lengthwise contiguous to one another in a row, into a tapered first pusher, the pusher having a plurality of continuous stages each of which has substantially the same longitudinal length as the length of the square article and substantially the same lateral length as the width of the square article, wherein at least one of the steps is omitted; advancing the first pusher a distance corresponding to the article after each feeding; and whereby, within a moving track of the pusher, pushing out the articles in front of the pusher stage, except for the articles being in front of the omitted portion, so that the articles are collected at both sides of an extension line drawn from the omitted portion in the track of the pusher.

A device of the invention includes a conveyor for conveying articles, a tapered first pusher movable in a longitudinal direction parallel to the conveyor, the pusher having a plurality of continuous stages each of which has substantially the same longitudinal length as the length of a square article and substantially the same lateral length as the width of the square articles and an omitted portion formed by omitting at least one of the inside stages; a first stopper provided in front of the omitted portion within the moving track of the pusher for preventing the article from coming into the omitted portion; a second stopper for intercepting the articles in front of the omitted portion; and a second pusher disposed at the opposite side of the first pusher with the conveyor therebetween for feeding a predetermined number of articles on the conveyor to the first tapered pusher.

DETAILED DESCRIPTION OF THE INVENTION

Figure 1:
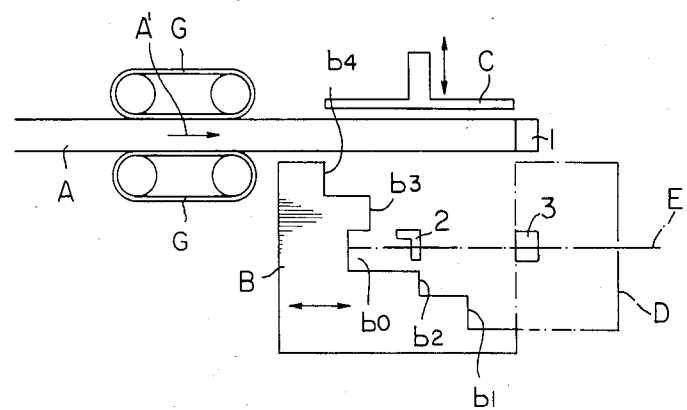
FIG. 1 is a plane view of a whole device used for collecting articles to form two lateral rows with a space corresponding to the size of one article therebetween.

FIG. 1 illustrates an entire device for collecting articles into groups so that two groups of articles may be juxtaposed with a space, which equal to one article therebetween.

Beside conveyor A, which contiguously conveys articles in a direction of arrow A' in FIG. 1, a pusher B is disposed movably in a lengthwise direction parallel to the conveyor A. A pusher C is disposed on the other side of the conveyor A.

Figure 2:
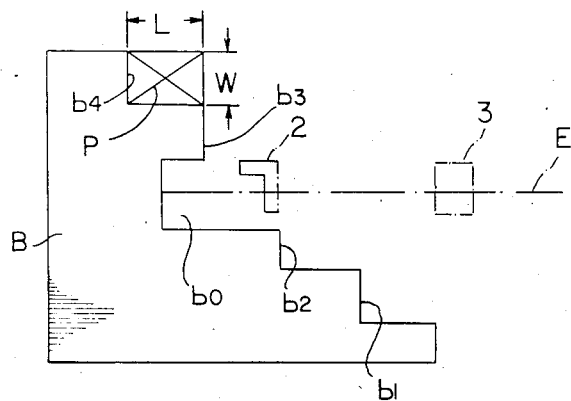
FIG. 2 is an enlarged plane view of a pusher thereof.

The pusher B as detailed in FIG. 2 is tapered. A plurality of stages, b1–b4, each having a longitudinal size which is the same as the length L of articles P and lateral size as a width W of the articles P are formed on the pusher B. An omitted portion b0 is formed by cutting out the third stage in the third row from the inside of a plurality of the stages. Thus, the articles P may be netered respectively into the stages b1–b4. Preferably, each of the stages b1–b4 is slightly larger than the article P so that the articles P will be fully entered thereon. Further, such larger stages allow the pusher P to avoid catching the article P and breaking the row in during assembly operation of the articles.

On an imaginary extension line E drawn from the omitted portion b0 within a moving track of the pusher B, a stopper 2 of an inverted L-shape having the same width as the width W of the article P is provided at the side (above in FIG. 2) of the second stage b2. The stopper 2 prevents the article P from being pushed into the omitted portion b0. Further, at the side of the front edge of the pusher B, a square stopper 3 having the same width as the width W of the article P is provided. The rear end of the stopper 3 lies on the same line as the front edge of the pusher B.

A pusher C can be moved over the conveyor A. It moves toward the pusher B and pushes each set of article groups conveyed by the conveyor A into the pusher B provided with stages. The pusher C has a width equal to the lateral length in FIG. 1 which corresponds to the number of articles to be handled. In the embodiment of FIG. 1, the width is equal to the length of four articles. Further, the pusher C functions as a kind of guide during actuation of the pusher B, and thus, the articles in the actuating pusher B can move orderly. A stopper 1 is provided just before the end of the conveyor A. The articles forwarded by the conveyor A are stopped by the stopper 1 to be jammed with one another.

In the Figures, G indicates a pair of right and left vertical belts arranged along the running direction of the conveyor A. Both vertical belts G repeat intermittent drive and stop. By this operation, a predetermined number of articles which have been randomly sent are fed to the side of the pusher C, and the succeeding articles (e.g., articles after the articles P4 in FIGS. 3(a) through 3(c) can be intercepted at the belts G. A stage base D is provided just before the pusher B.

When the invention is in use, articles can be collected into a group consisting of two longitudinally, two laterally, and in total four articles, along the lateral line with one operation through the processes shown in FIGS. 3(a) through 3(g).

Figure 3:
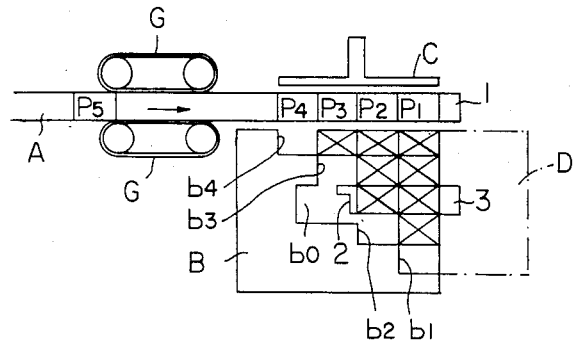
FIGS. 3(a) through 3(h) are plane views illustrating processes in order for collecting the articles by the device of FIG. 1.

In particular, as shown in FIG. 3(a), eight articles are set in advance so that the end surfaces of the articles at the left end are aligned with the end surfaces of the stages of the pusher B. Four articles are preset at the side of the foremost stage b1 of the pusher B, three are preset at the side of the next stage b2, and one is preset at the side of the stage b3 just after the next omitted portion b0. As described above, the number of the articles before the omitted portion b0 is reduced one by one toward the omitted portion b0. The number of articles placed in the stage b3 which is just after omitted portion b0, is a difference between the number of articles placed in stage b2 and the number of articles engagable in the omitted portion b0. In the stage thereafter, the number is reduced one by one towards the last stage b4. In this case, an article is not placed in front of each of the stages b1-b4 of the pusher B to leave them empty.

The conveyor A randomly carries the articles. The front article P1 is stopped by the stopper 1 provided at the front end of the conveyor A. Thus along the side of the pusher C, the following three commodities P2-P4 are stopped adjacent to the rear of article P1.

Figure 3B:
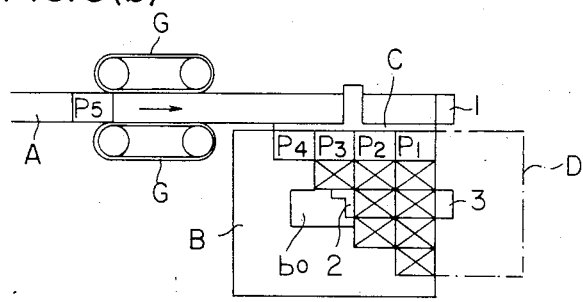

At the instant when the articles P1-P4 are fed to the side of the pusher C, the pusher C operates, as shown in FIG. 3(b), to push the four contiguous articles P1-P4 lengthwise into the pusher B keeping the row. Thus, the article P4 at the rear end is pushed to the rear end stage b4 and the articles P3-P1 are respectively set in front of the article P4. Further, by such movement of the articles P3-P1, each of the articles placed just before the pusher B is fed in the transverse direction (down in the drawing) by a distance equal to one article. Thus, the articles are received in the empty spaces in front of the stages. In particular, the commodity at the right end of the first row is received in the front stage b1 of the pusher B, and the article at the right end of the second row is received in the second stage b2. In this case, since the stopper 2 is disposed just before the omitted portion b0, the article does not enter into the omitted portion b0, as shown in FIG. 3(b).

Figure 3C:
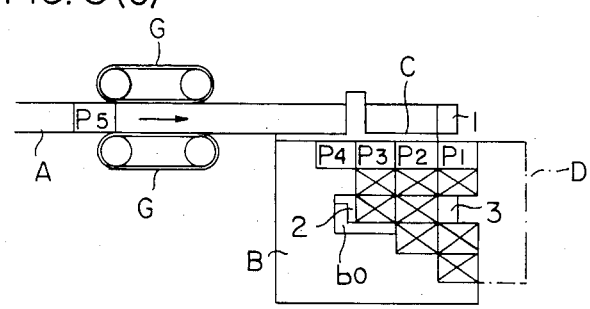

In this instant, when the pusher B is advanced by a length L of the article B, the articles including the article P1 at the front row of the pusher B are pushed onto the stage base D or the like as shown in FIG. 3(c). Since the stopper 3 is provided on the extension line of the omitted portion b0 in the trace of the pusher B, the article on the extension line E is intercepted by the stopper 3 and are not pushed out. Therefore, as shown in FIG. 3(d), two commodities are collected at the right and left sides of the stopper 3, respectively.

Figure 3D:
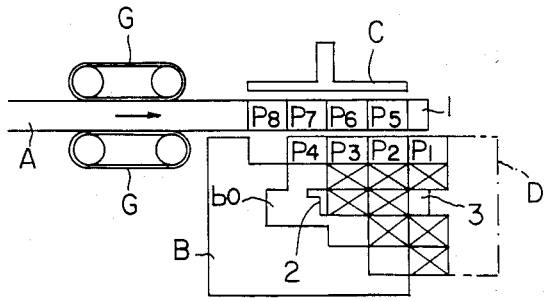

During this process, when the pusher C moves back, the articles P5-P8 are fed to the side of the pusher C as shown in FIG. 3(d). When the pusher C moves forward immediately after the article P8 comes to the side of the pusher c, the articles P5-P8 are pushed sideways similarly to the previous operation made for articles P1-P4. Thus, the articles P5, P6 and P7 are pushed to positions adjacent to the commodity P2 at the left end of the front row, the article P3 at the left end of the second row and the article P4 at the left end of the third row, respectively. The article P8 at the rear end is pushed into the last empty stage b4 of the pusher B. Further, in accordance with the movement of the articles P5-P7, each of the articles just before the pusher B are fed in the transverse direction. Thus, they are positioned in the empty portions of the stages in such a way that the article at the right end of the first row is fed to the front of stage b1 of the pusher B and the article at the right end of the second row is fed into the second stage b2 of the pusher B.

Figure 3G:
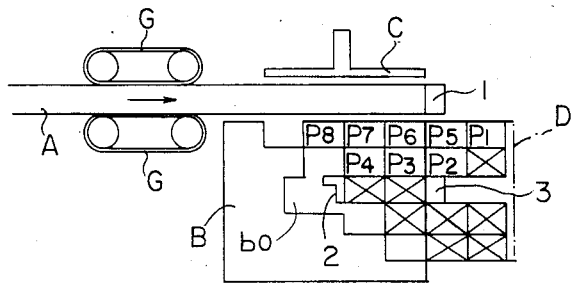
Figure 3E:
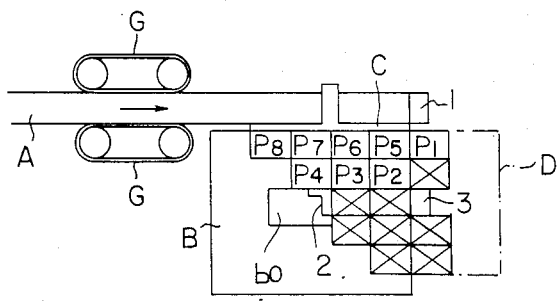
Figure 3H:
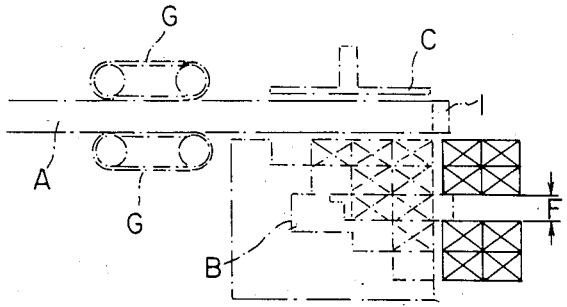
Figure 3F:
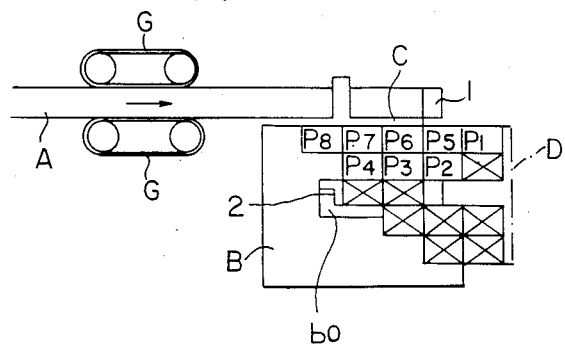

When the pusher B is advanced (towards the right in the drawing) again as shown in FIG. 3(f), four articles including those P2 and P6 at the front row of the pusher B except for those just behind the stopper 3 are pushed onto the storage base D similar to the last operatoin, and positioned at the rear sides of the articles pushed out during the previous operation, as shown in FIG. 3(g). Therefore, the articles are separated into groups respectively consisting of two longitudinal and two lateral articles and collected on both sides of the stopper 3 along a lateral line.

By repeating the above described operation, articles can be efficiently collected.

As described above, it is possible to easily modify the collected number and collected pattern of articles and the space (width F in FIG. 3(h)) between the groups by changing the sizes of the pusher C, the number of the articles pushed thereby, the number of the stages of the pusher B, the sizes of the omitted portion and the sizes of the stoppers 2 and 3.

Figure 5:
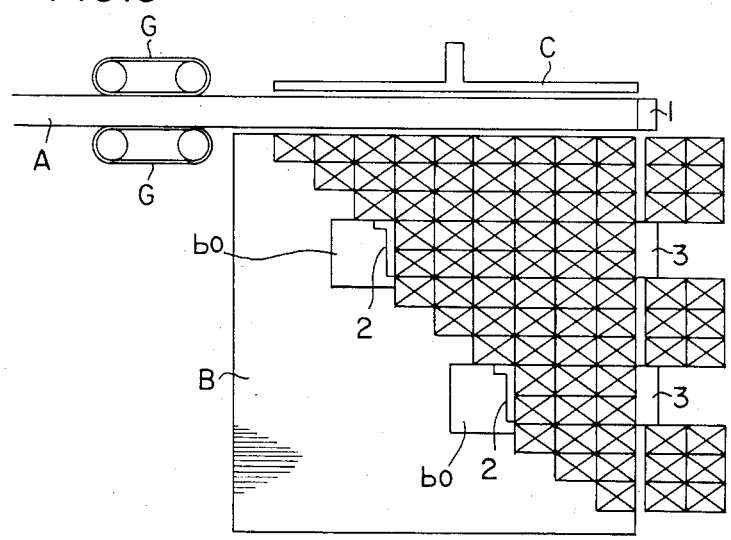
FIG. 5 is a plane view of the articles collected by the device in FIG. 4.

Further, the articles collected as shown in FIG. 3(g), FIG. 3(h) and FIG. 5 can be taken to in the a direction parallel to the running direction of the conveyor A. This is advantageous in relation to installation space, arrangement and disposition, i.e., layout of a series of devices including a packing process thereafter.

In the device in FIG. 1, when the mechanisms are actuated in order as shown in FIGS. 3(a) through 3(g), two sets of the articles, each set of which includes two longitudinal, two lateral and in total four articles, are collected at the right and left with a space corresponding to one article therebetween.

When the pusher C shown in FIG. 3(g) is reactuated to push four commodities into the pusher B, and the pusher B is reactuated, two sets of the articles, each set consisting of three longitudinally, three laterally and in total six articles, are collected with space corresponding to one article therebetween. Thus, when the actuating number of the pushers C and B are changed as desired, the number of articles aligned longitudinally can be easily changed without changing the number of articles laterally aligned. In other words, the collecting number and the collecting pattern can easily be changed.

When the stage base D is moved slightly forward from the position of FIG. 3(g) to form a slight space between the collected articles and the articles following as shown in FIG. 3(g), no possibility of pushing the articles by the pusher C into the pusher B may be inferred.

Figure 4:
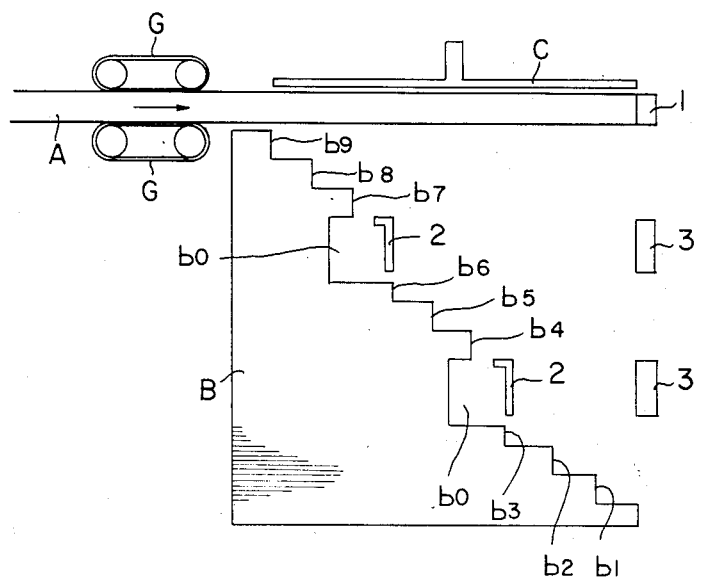
FIG. 4 is a plane view of a whole device of another embodiment of the invention.

Further, the pusher B may be formed as shown in FIG. 4. Each of the widths of the omitted portion b0 and the stoppers 2 and 3 are twice as large as that of the article. Also, the pusher C is increased in size so as to push nine articles. The device shown in FIG. 4 collects article groups respectively consisting of two longitudinally, three laterally and in total six articles along a lateral line with spaces corresponding to the length of two articles therebetween. In this case, stages b1-b3, b4-b6 and b7-b9 are formed continuously, respectively. Omitted portions b0 having substantially the same width as that of two articles are formed between the three series of the stages, respectively. In front of the omitted two portions b0 of the pusher B, stoppers 2 respectively having an inverted L-shape and width which is twice as long as the width W of the article P are provided. These stoppers positioned at the side of the third stage b3 and the sixth stage b6, respectively. Further, in front of these stoppers and at the side of the front edge of the pusher B, square stoppers 3 respectively having widths twice as long as the width W of the article P are provided. The rear end surfaces of the stoppers 3 lie on the same line as the front end surface of the pusher B. The width of the pusher C corresponds to the total length of nine articles P.

With this device, for example, as shown in FIG. 5, the articles can be collected into three groups which respectively include two articles longitudinally, three articles laterally and in total six articles with spaces which are respectively equal to two articles therebetween. When the actuating number of the pushers B and C is increased it is possible to collect the articles into separate groups, in which the number of longitudinally aligned articles can vary without changing the number of articles laterally aligned.

In these cases, the grouped articles can be taken out in the parallel direction to the conveyor A. Therefore, the system is advantageous in installation space, arrangement and disposition, i.e., layout, of a series of other devices including packaging processes.

Figure 6:
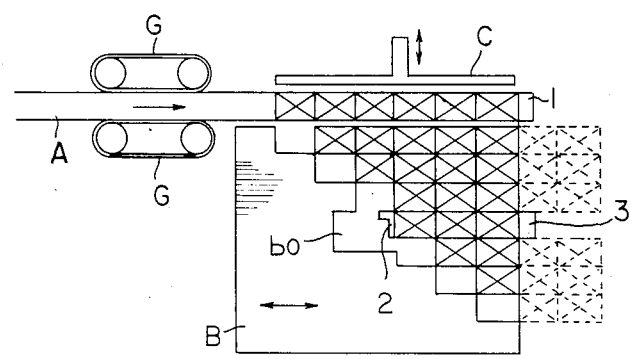
FIG. 6 is a plane view of still another embodiment wherein articles are grouped into two sets, each group consisting of two longitudinally, three laterally and in total six articles with a space corresponding to the size of one article therebetween.
Figure 7:
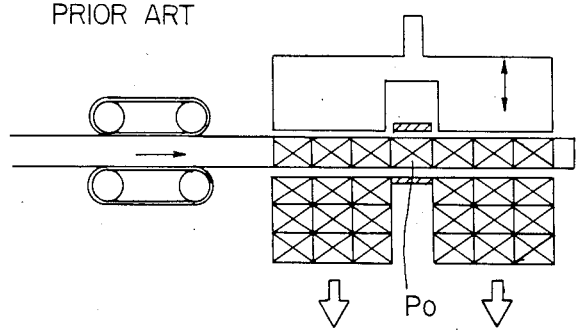
FIG. 7 is a plane view illustrating a prior art system employed in the past.

FIG. 6 illustrates an embodiment of this invention for collecting two sets of articles, each set consisting of two longitudinal, three lateral and in total six articles, with a space therebetween corresponding to the size of one article. In this case, the pusher C and the pusher B operate twice to collect two groups of articles, each group consisting of two longitudinally, three laterally and six articles in total, with a space corresponding to one article therebetween. In comparison with a conventional case which requires a pusher C to operate three times, according to the present invention, the operation time of the pusher C can be reduced by one time. In this case, the collected articles can be taken out parallel to the running direction of the conveyor A similar to the previous embodiment and thus, the aforementioned advantages can be obtained in many cases.

According to the method of the present invention, the articles are efficiently separated and collected in groups respectively including a predetermined number of articles with a space therebetween. The handling efficiency can be remarkably increased in comparison with conventional devices. Further, since the collected articles can be taken out parallel to the running direction of the conveyor A, the system does not obstruct the installation space of the device as well as the arrangement and disposition, i.e. layout, of a series of device including a packaging process in many cases.

Further, according to the device of the present invention, the articles can be automatically and surely separated and collected into groups respectively including a predetermined number of articles with predetermined space therebetween. Particularly, the articles fed in the transverse direction are securely received by the pusher provided with the stages, which prevents the articles from tumbling and becoming disorderly.

I claim:

1. A method for collecting articles comprising the steps of:

pushing transversely a predetermined number of articles into a tapered pusher, said articles being arranged longitudinally straight and said tapered pusher having a stepped configuration of a plurality of stages wherein each stage has a longitudinal side substantially equal to a length of said article and a transverse side substantially equal to a width of said article and at least one said stages in a middle portion of the tapered pusher is omitted, and said articles being prevented from entering into said omitted stage of said tapered pusher by a stop means; and longitudinally advancing said pusher a distance equal to said length of said article so that the articles except for those in front of said omitted stage are pushed out of said pusher in a manner that said articles are grouped on either side of an imaginary line which is drawn from said omitted stage.

2. An apparatus for collecting articles comprising:

a conveyor for longitudinally conveying a series of articles;

a first pusher provided on one side of said conveyor;

a tapered second pusher provided on the other side of said conveyor, said tapered second pusher having a stepped configuration of a plurality of stages wherein each stage has a longitudinal side substantially equal to a length of said article and a transverse side substantially equal to a width of said article and at least one of said stages in a middle portion of the tapered pusher is omitted, said first pusher transversely pushing a predetermined number of articles into said tapered second pusher which reciprocates parallel to said conveyor;

a first stopper provided in front of said omitted stage, said first stopper preventing articles from coming into said omitted stage; and a second stopper provided in front of said first stopper, said second stopper preventing articles from being pushed out by said tapered pusher.

* * * * *